W. C. C. ERSKINE.
Coffee Pot.

No. 90,159.  Patented May 18, 1869.

Witnesses

Inventor

United States Patent Office.

W. C. C. ERSKINE, OF NETHER KINNEDDER DUNFERMLINE, SCOTLAND.

Letters Patent No. 90,159, dated May 18, 1869.

COFFEE-POT.

The Schedule referred to in these Letters Patent and making part of the same.

*To all whom it may concern:*

Be it known that I, W. C. C. ERSKINE, of Nether Kinnedder, Dunfermline, Fifeshire, in Scotland, have invented a new and useful Improvement in Coffee-Pots; and I do hereby declare that the following is a full, clear, and exact description thereof, which will enable others skilled in the art to make and use the same, reference being had to the accompanying drawings, forming part of this specification.

This invention relates to improvements in coffee-pots, designed to provide a better arrangement for extracting the essence of the coffee, and separating it from the grain, than any now in use; and It consists in the peculiar construction of the strainer, whereby two increased straining-surfaces are produced, of unequal fineness, as will be hereinafter more fully described.

Figure 1:
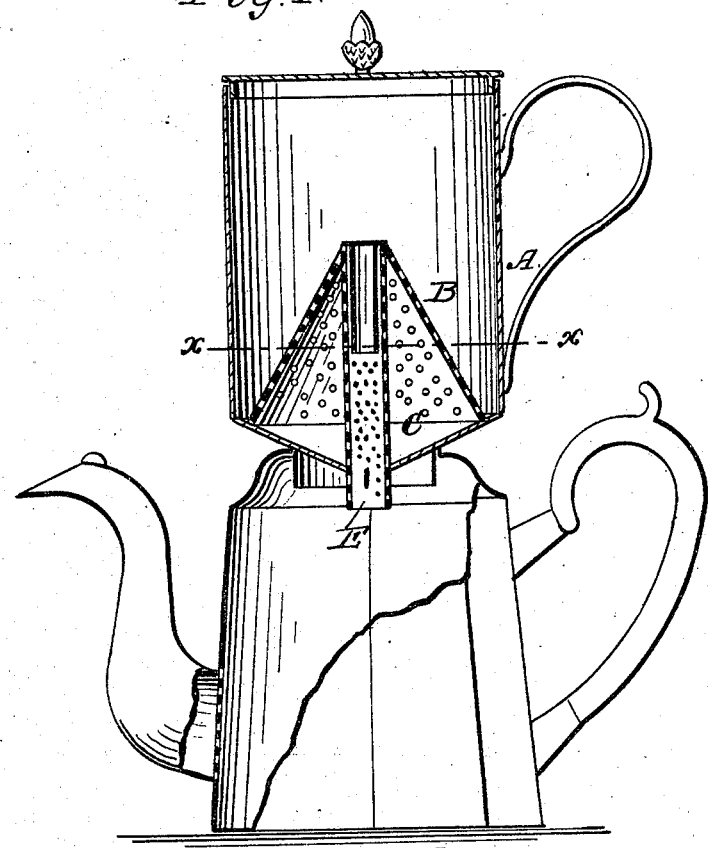
Figure 2:
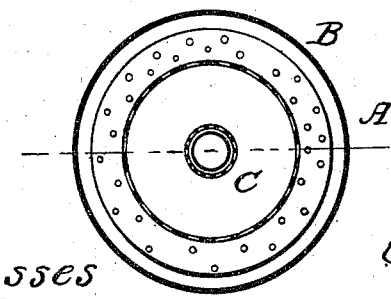

Figure 1 represents a sectional elevation of my improvement, applied to a coffee-pot; and Figure 2 represents a section of the same, taken on the line $x\ x$ of fig. 1.

Similar letters of reference indicate corresponding parts.

A represents a sheet-metal vessel, preferably of round form, and having a conical bottom, adapted to fit into the opening through the top of an ordinary tea or coffee-pot.

Within the vessel A, I provide a perforated cone, B, having an opening in the top.

Within this cone, and extending through a hole in the bottom of the vessel A, I provide a perforated tube, C, the said perforations being smaller than those in the cone B.

The said tube is stopped at the top, and opened at the bottom.

A key, E, may be passed through the lower end of the latter, below the bottom of the vessel A, to hold the cone B down to the said bottom, but so arranged that it may be readily detached, from time to time, for removing any of the finer grains that may pass through the perforations of the cone.

The ground coffee is placed in the vessel A, above the cone B, and the hot water poured thereon, in any required quantity, and allowed to stand a short time, for the water to filter through the coffee and the perforated cone and tube, which it readily does, and passes into the pot below, taking up, at the same time, the strength of the coffee, but leaving the solid matter.

Having thus described my invention,

I claim as new, and desire to secure by Letters Patent—

The strainer, constructed as described, of the cone B, provided with coarse perforations, and the finely-perforated tube C, extending vertically through said cone, both arranged as described, and adapted for attachment to the interior of the case A, in the manner set forth, for the purpose specified.

The above specification of my invention signed by me, this 29th day of January, 1869.

W. C. C. ERSKINE.

Witnesses:
FRANK BLOCKLEY,
ALEX. F. ROBERTS.